United States Patent [19]

Yabuki

[11] Patent Number: 5,796,351
[45] Date of Patent: Aug. 18, 1998

[54] SYSTEM FOR PROVIDING INFORMATION ABOUT EXHIBITION OBJECTS

[75] Inventor: Tsutomu Yabuki, Kawasaki, Japan

[73] Assignee: Fujitsu Limited, Kawasaki, Japan

[21] Appl. No.: 626,517

[22] Filed: Apr. 2, 1996

[30] Foreign Application Priority Data

Apr. 4, 1995 [JP] Japan ................................. 7-078848

[51] Int. Cl.$^6$ ................................................... G06F 19/00
[52] U.S. Cl. ............................... 340/625.69; 340/825.72; 340/825.54; 340/825.35; 340/572; 235/383; 364/478.03; 364/478.13; 705/21; 705/27
[58] Field of Search ........................ 340/825.69, 825.72, 340/825.54, 825.35, 825.49, 825.25, 573, 572; 364/400, 478.03, 478.07, 478.13; 370/498; 705/20, 21, 22, 26, 27, 28

[56] References Cited

U.S. PATENT DOCUMENTS

| | | | |
|---|---|---|---|
| 4,163,123 | 7/1979 | Brodsky et al. | 370/498 |
| 4,750,151 | 6/1988 | Baus | 340/825.35 X |
| 5,214,410 | 5/1993 | Verster | 340/572 |
| 5,351,186 | 9/1994 | Bullock et al. | 364/400 X |
| 5,457,307 | 10/1995 | Dumont | 235/383 |
| 5,461,371 | 10/1995 | Matsumoto et al. | 340/825.25 |
| 5,595,264 | 1/1997 | Trotta, Jr. | 235/383 X |

*Primary Examiner*—Brian Zimmerman
*Assistant Examiner*—William H. Wilson, Jr.
*Attorney, Agent, or Firm*—Armstrong, Westerman, Hattori, McLeland, & Naughton

[57] ABSTRACT

A system provides a user with proper information about a target exhibition object among many exhibition objects in exhibition facilities according to a user's request. The system has a database system for storing information about exhibition objects, a host computer, and at least one terminal. The host computer has a host transmitter/receiver unit and retrieves information from the database system according to the identification code of a given exhibition object. Each of the exhibition objects has a communication unit that returns an identification code in response to a request signal. The terminal has a terminal transmitter/receiver unit for communicating with the host computer, an operation switch for generating the request signal according to a user's operation, an object communication unit for transmitting the request signal to a target exhibition object and receiving an identification code therefrom, an information output unit for providing the user with information about the target, and a control unit. The control unit transmits the request signal toward a target exhibition object through the object communication unit in response to a user's operation of the operation switch to select a target exhibition object from the exhibition objects, receives an identification code from the target through the object communication unit, transmits the identification code to the host computer through the terminal transmitter/receiver unit, receives information about the target from the host computer through the terminal transmitter/receiver unit, and provides the user with the information through the information output unit. The host computer retrieves the information about the target from the database system according to the identification code and transmits the information to the terminal through the host transmitter/receiver unit.

10 Claims, 8 Drawing Sheets

SYSTEM FOR PROVIDING INFORMATION ABOUT EXHIBITION OBJECTS

BACKGROUND OF THE INVENTION

1. Field of the Invention

The present invention relates to a system for providing visitors with information about exhibition objects in exhibition facilities such as museums, trade fairs, zoos, and factories.

2. Description of the Related Art

Exhibition facilities such as museums employ display panels, brochures, audio and video equipment, etc., to provide visitors with information about exhibition objects. These devices handle only limited pieces of information, which are provided in one direction from the facilities to visitors. The facilities usually have no means to respond to visitor's requests for more information about the exhibition objects.

To provide visitors with more information, the facilities may have a database for storing many pieces of information and terminals equipped with a touch-panel or a display with a mouse to let visitors specify any exhibition object for detailed information. The touch-panel or display is incapable of displaying all exhibition objects of the facilities at the same time if the number thereof is large. In this case, the touch-panel or display shows them stage by stage, to require complicated operations from the user, or it must have a large screen. In this way, the conventional system to provide visitors with requested information about exhibition objects is complicated, large, and expensive, and therefore, it is difficult for the facilities to have a plurality of them.

Exhibition objects may be classified into groups according to, for example, kinds, locations, or functions, and the system or terminal mentioned above may be installed for each group. In this case, many terminals are needed and increase the cost and installation space. This problem will be serious if the number of groups is increased to reduce the number of exhibition objects in each group. If the number of exhibition objects of each group is increased to avoid this problem, there will be another problem that it is difficult for the user to specify a target exhibition object among many objects of the same kind in each group displayed on the terminal. For example, when the user wants to have information about one of a group of animals of the same kind in a zoo, it is very difficult for the user to specify the target on the terminal. When the user wants to know the birthplace and parent-child relationship of a specific of elephants, for example, it is very difficult for the user to specify the specific one on the display of the terminal because the elephants move and because the number of elephants displayed is limited. If the user specifies the wrong one, he or she will obtain incorrect information.

SUMMARY OF THE INVENTION

An object of the present invention is to provide a low-cost system for providing proper information about an optional exhibition object according to a user's request.

In order to accomplish the object, the present invention provides a system for providing information about exhibition objects, having a database system for storing information about the exhibition objects, a host computer having a host transmitter/receiver unit, for retrieving information from the database system according to the identification code of a given exhibition object, and at least one terminal. Each of the exhibition objects has a communication unit that returns an identification code in response to a request signal. The terminal has a terminal transmitter/receiver unit for communicating with the host computer, an operation switch for generating the request signal according to a user's operation, an object communication unit for transmitting the request signal to any one of the exhibition objects and receiving an identification code therefrom, an information output unit for providing the user with information about a given exhibition object, and a control unit for transmitting the request signal through the object communication unit in response to a user's operation of the operation switch, receiving an identification code through the object communication unit, transmitting the identification code to the host computer through the terminal transmitter/receiver unit, receiving information about the object from the host computer through the terminal transmitter/receiver unit, and providing the user with the information through the information output unit. The host computer retrieves the information about the object from the database system according to the identification code transmitted from the terminal and transmits the information to the terminal through the host transmitter/receiver unit.

It is preferable that the host computer and terminal communicate with each other by wireless, and that the terminal is portable.

The user of the terminal specifies an exhibition object about which the user wants to obtain information and operates the operation switch of the terminal. The object communication unit of the terminal transmits a request signal to the communication unit of the exhibition object, which returns an identification code. The terminal receives the identification code through the object communication unit. According to the present invention, the user can directly specify a target exhibition object as the user sees the same, so that it is easy for the user to correctly specify the object. The terminal is simpler than the conventional devices.

A system according to a second aspect of the present invention is capable of not only providing the user with information about exhibition objects but also letting the user purchase goods and services available in exhibition facilities. The goods and services have communication units, respectively. The user operates a terminal to transmit a request signal toward a target one of the goods and services. The communication unit of the target returns an identification code and price code. According to the codes, the terminal provides the user with the price of the target. When the user operates a purchase switch of the terminal while the information about the target is being provided, the terminal transmits the identification code of the target and a purchase signal to a host computer. According to the code and signal, the host computer manages the accounts of the user of the terminal.

The second aspect of the present invention enables the user to obtain information about any goods or services provided by the facilities and purchase the selected one.

Depending on the size and arrangement of the facilities, the system may have stations so that each terminal communicates with the host computer via any one of the stations. The stations may be allocated to groups of exhibition objects, respectively. Each station has a database system that stores information about exhibition objects of the corresponding group. When a given station receives an identification code from a terminal, the station retrieves information from the database system according to the code and provides the terminal with the information.

It is preferable that the stations and terminals communicate with each other by wireless, and that the terminals are portable.

Each terminal may have a database system. In this case, the host computer may be omitted. The host computer, however, is useful to generally monitor and control the system.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 1:
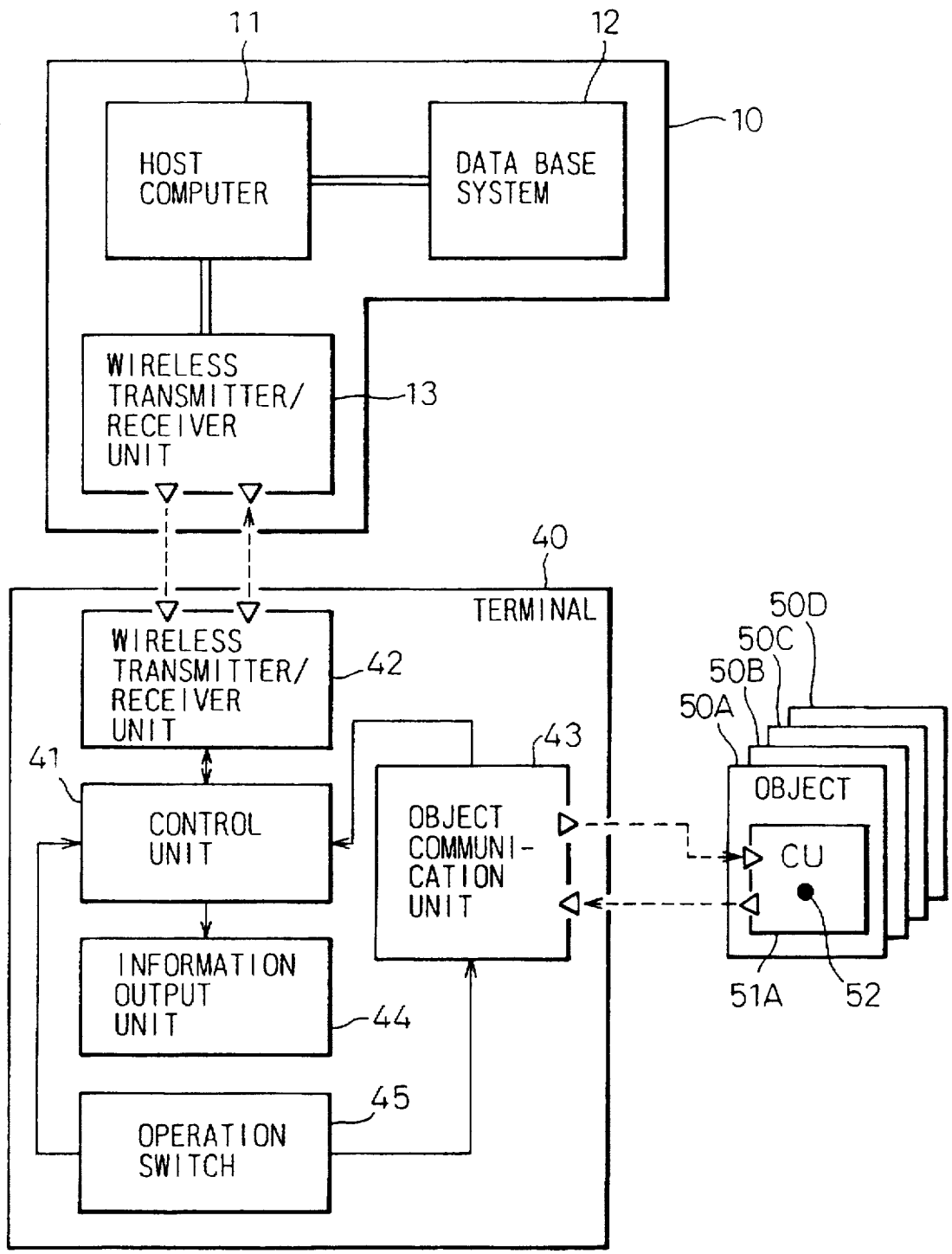
FIG. 1 is a block diagram showing a system according to a first embodiment of the present invention.

FIG. 1 is a block diagram showing a system for providing information about exhibition objects according to the first embodiment of the present invention.

A general control unit 10 controls the system as a whole. The unit 10 has a host computer 11, a database system 12 for storing information about the exhibition objects, and a wireless transmitter/receiver unit 13. A terminal 40 has a control unit 41, a wireless transmitter/receiver unit 42 to communicate with the general control unit 10, an object communication unit 43 for communicating with an exhibition object, an information output unit 44 for providing the user with information about the exhibition object, and an operation switch 45 operated by the user. There are exhibition objects 50A to 50D having communication units (CUs) 51A to 51D, respectively, each for returning an identification signal in response to a request signal from the terminal 40. Each of the communication units 51A to 51D is generally represented with a reference numeral 51. Each exhibition object may have a plurality of communication units 51 that return the same identification signal. For example, an animal of a zoo may have several communication units 51 so that at least one of them may face the user of the terminal 40 even if the animal moves.

The object communication unit 43 sends a directional wireless signal toward the communication unit 51 of a target exhibition object. In response to the signal, the communication unit 51 returns a wireless signal representing the identification code of the target. The object communication unit 43 receives the identification code and decodes the same. The object communication unit 43 may be a transceiver and the communication unit 51 a transponder as disclosed in US Pat. No. 5,214,410. The units 43 and 51, however, are not limited to the transceiver and transponder but may be any devices having the functions mentioned above. The units 43 and 51 are chosen according to the exhibition facilities and exhibition objects.

If a request signal from the transceiver 43 is received by different exhibition objects, the transponders 51 of these objects will simultaneously return their own identification codes, to confuse the terminal 40. To avoid the confusion, the wireless signal transmitted from the transceiver 43 must be highly directional. In addition, the terminal 40 must be designed so that the user may easily direct an output port of the transceiver 43 toward the transponder 51 of a target exhibition object.

Figure 2:
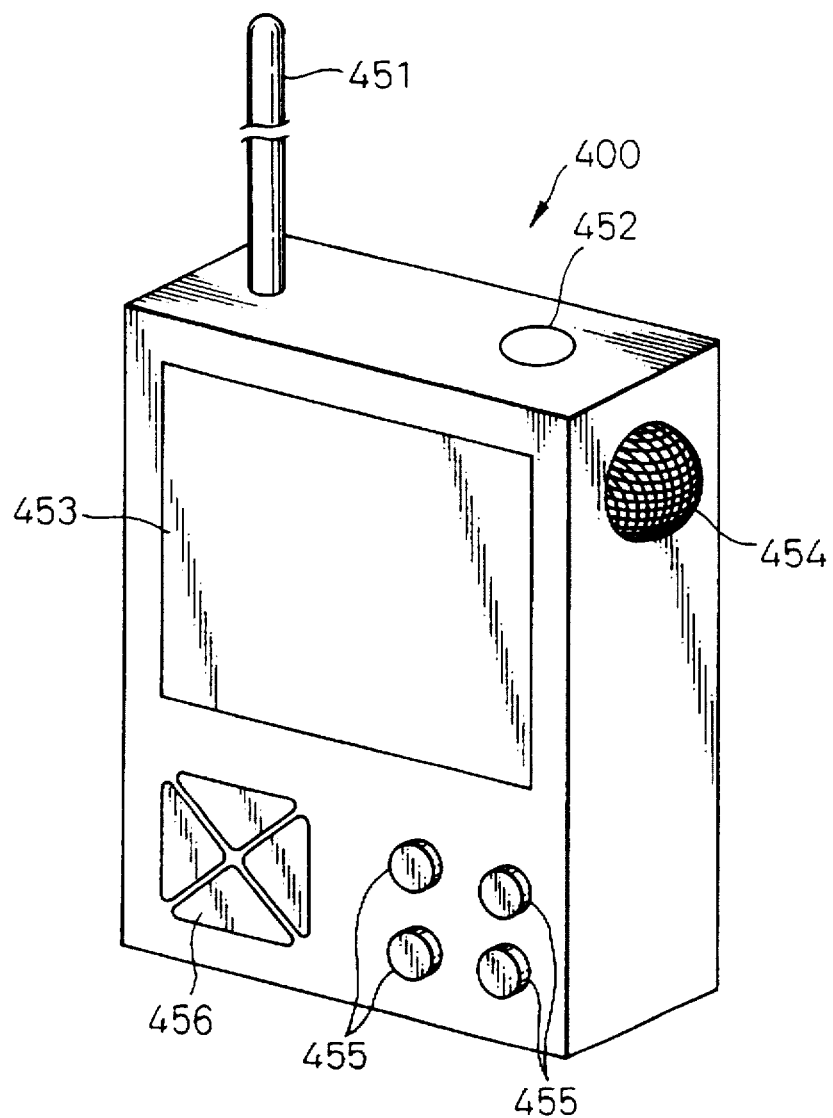
FIG. 2 is a perspective view showing a terminal according to the present invention.

Accordingly, the terminal 40 of the present invention is portable as shown in FIG. 2.

In FIG. 2, the terminal 40 has an antenna connected to the wireless unit 42, the output port 452 of the transceiver 43, a display 543 for displaying information, a speaker 454 for providing voice information, switch buttons 455 for controlling the terminal 40, and direction keys 456 for moving a cursor on the display 453. The user directs the output port 452 toward the transponder 51 of a target exhibition object and manipulates the switch buttons 455.

The terminal 40 may be fixed adjacent to exhibition objects. In this case, at least the transceiver 43 or the output port 452 must be portable so that it is directed toward the transponder 51 of a target exhibition object.

In a zoo, exhibition objects, i.e., animals move and herd, and therefore, an unintended animal may return an identification signal to the terminal 40. To avoid this problem, the transponder 51 of each exhibition object may have an indicator 52 such as an LED that turns on when the corresponding transponder 51 returns an identification signal in response to a request signal from the terminal 40. Then, the user of the terminal 40 can recognize whether or not the object is an intended one.

Figure 3:
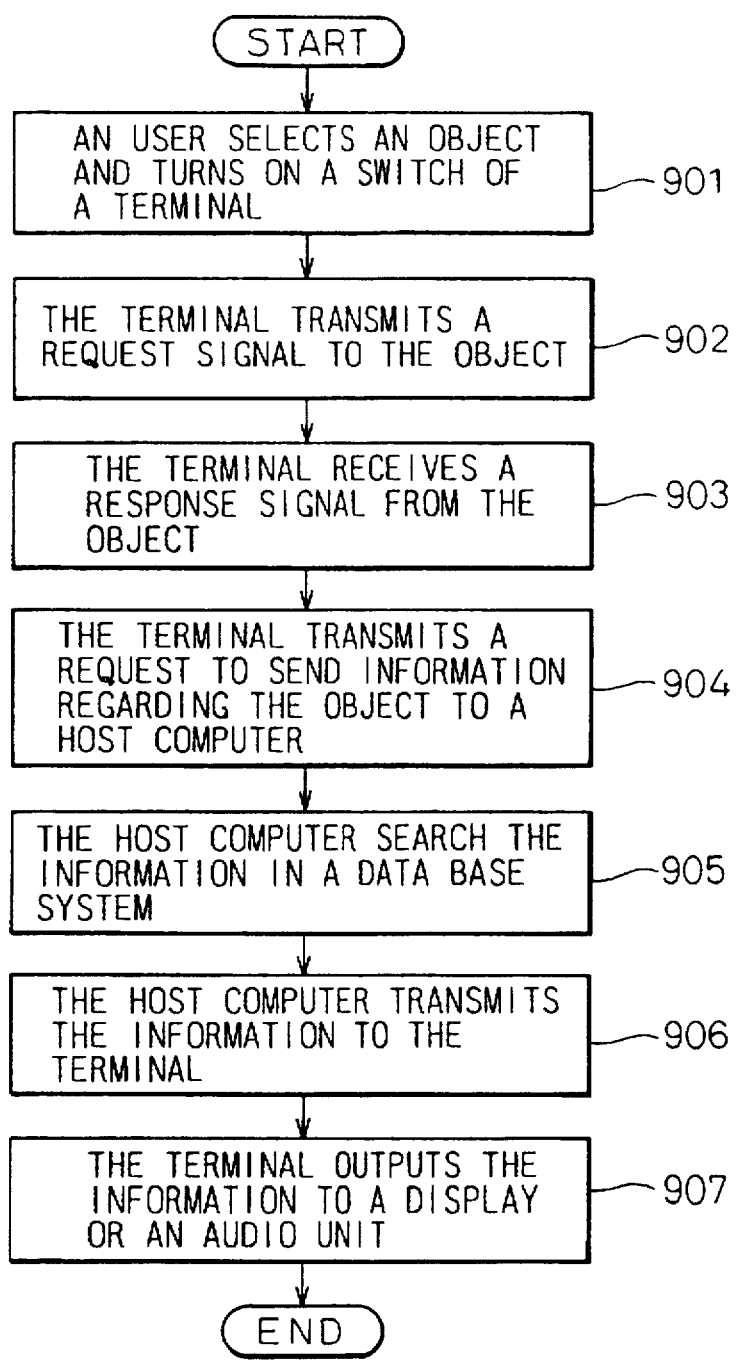
FIG. 3 is a flowchart showing the operation of the system of the first embodiment.

FIG. 3 is a flowchart showing the operation of the system of the first embodiment.

In step 901, the user directs the output port 452 of the terminal 40 toward the transponder 51 of a target exhibition object and pushes the operation switch 45. In step 902, the transceiver 43 of the terminal 40 transmits a request signal. In response to the request signal, the transponder 51 of the target returns a coded identification signal. In step 903, the transceiver 43 receives the identification signal and decodes the same. In step 904, the control unit 41 transfers the decoded signal to the wireless unit 42, which transmits a wireless identification signal to the wireless unit 13 of the general control unit 10. In step 905, the host computer 11 retrieves information about the target from the database system according to the identification signal. In step 906, the host computer 11 transfers the retrieved information to the wireless unit 13, which transmits the information to the wireless unit 42 of the terminal 40. In step 907, the control unit 41 transfers the information to the information output unit 44, which provides the user with the information. The information output unit 44 may have a display, an earphone, a headphone, etc.

In this way, the present invention allows the user to directly specify an exhibition object about which the user wants information. Even if the object is moving, such as an animal in a zoo, the user may easily and correctly specify the object. The user can obtain information about any exhibition object whenever the user wants it.

Figure 4:
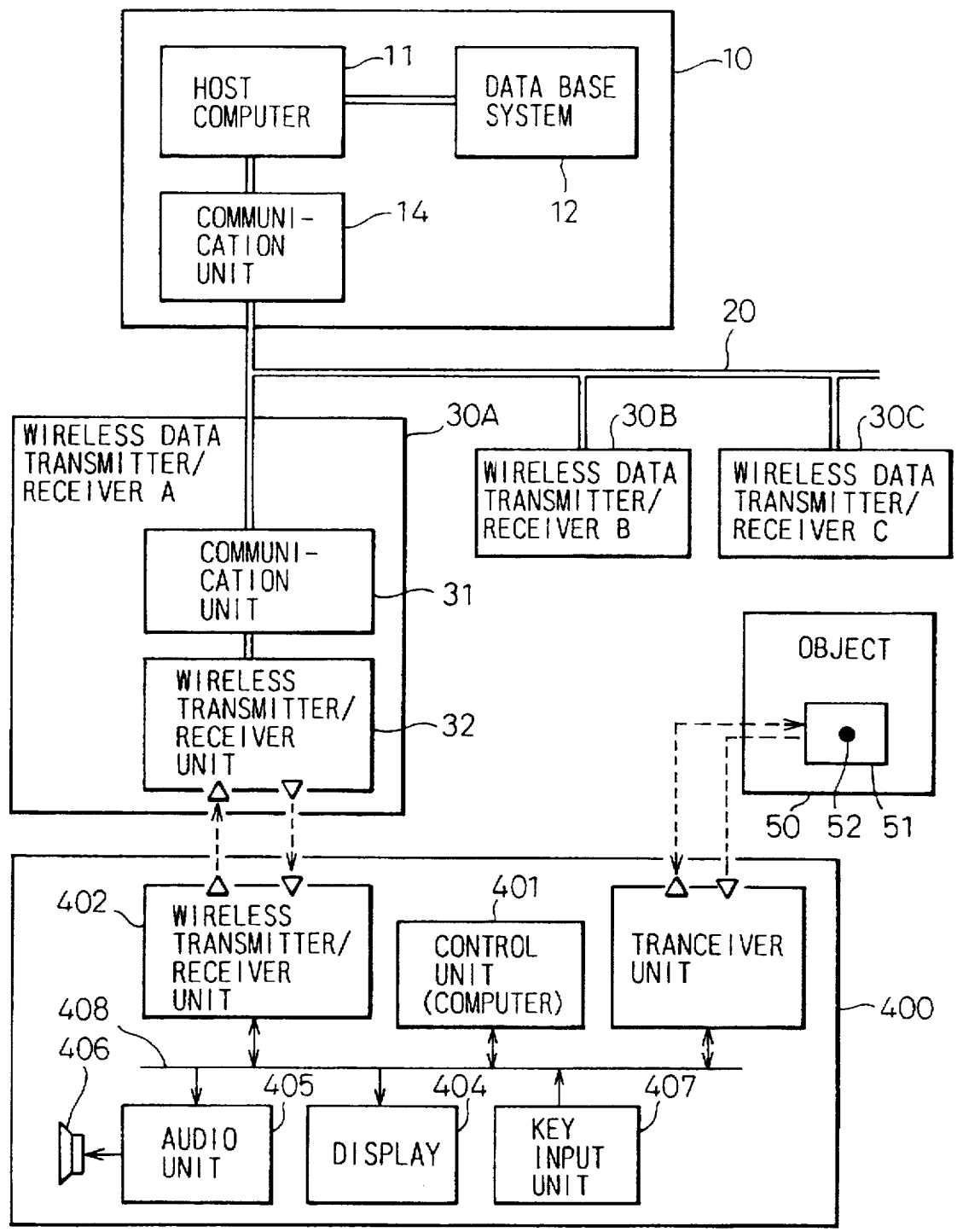
FIG. 4 is a block diagram showing a system according to a second embodiment of the present invention.

FIG. 4 is a block diagram showing an information system according to the second embodiment of the present invention.

A general control unit 10 has a communication unit 14 instead of the wireless unit 13 of the first embodiment. Although the communication unit 14 is wired, it may be wireless. A terminal 400 resembles the terminal 40 of the first embodiment. The control unit 41, wireless transmitter/receiver unit 42, object communication unit (transceiver) 43, and operation switch 45 of the first embodiment correspond to a control unit (a computer) 401, a wireless transmitter/receiver unit 402, a transceiver 403, and a key input unit 407, respectively. The information output unit 44 of the first embodiment corresponds to a display 404, an audio unit 405, and a speaker 406. Namely, information about an exhibition object is provided as images and voices. Each exhibition object 50 has a communication unit (transponder) 51 and an indicator (an LED) 52.

The second embodiment employs wireless data transmitter/receiver stations 30A to 30C that are connected to the general control unit 10 through a wired LAN. Each of the stations 30A to 30C has a communication unit 31 for communicating with the communication unit 14 of the general control unit 10, and a wireless transmitter/receiver unit 32 for communicating with the wireless unit 402 of the terminal 400. The wireless unit 32 receives an identification code from the wireless unit 402 of the terminal 400 and transfers the same to the communication unit 31, which transmits the same to the general control unit 10. The communication unit 31 receives information about an exhibition object from the general control unit 10 and transfers the same to the wireless unit 32, which transmits the same to the terminal 400. In this way, the stations 30A to 30C are relay stations each having a function of preventing a data collision during a relay operation. Since this type of relay station is widely known, the details thereof will not be explained here.

The number and arrangement of the stations are determined according to the size of the exhibition facilities and exhibition objects.

The operation of the second embodiment is the same as that of the first embodiment, and therefore, is not explained again.

According to the first and second embodiments, the control unit 41 (401) is a computer. Since the task of the computer is simple, the computer may be replaced with logic circuits.

Figure 5:
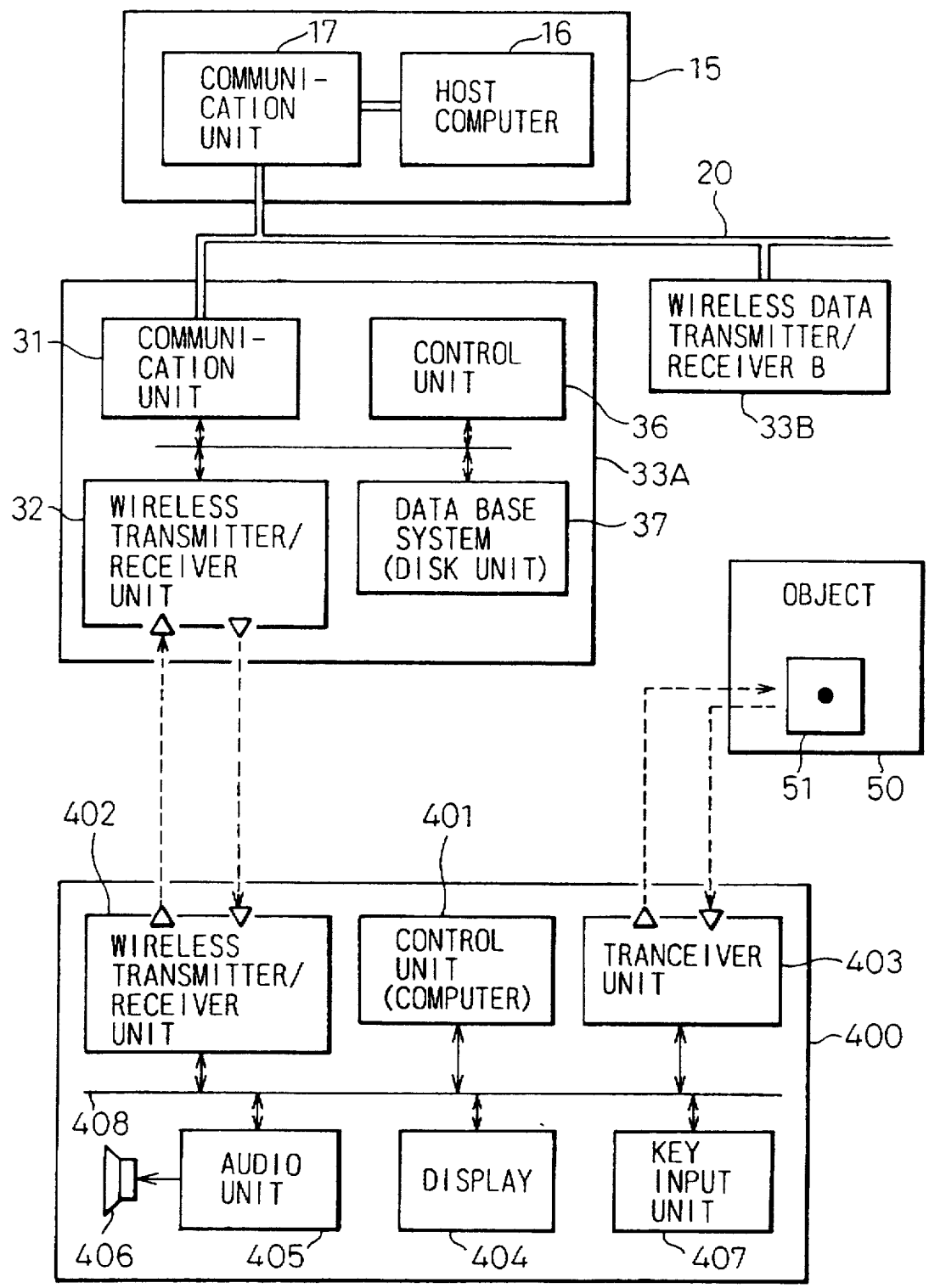
FIG. 5 is a block diagram showing a system according to a third embodiment of the present invention.

FIG. 5 is a block diagram showing a system for providing information about exhibition objects according to the third embodiment of the present invention.

The third embodiment resembles the second embodiment but differs therefrom in that wireless data transmitter/receiver stations 33A and 33B have each a database system 37. Each of the stations has a communication unit 31, a wireless transmitter/receiver unit 32, the database system 37, and a control unit 36. The wireless unit 32 receives an identification code from a terminal 400. According to the identification code, the control unit 36 retrieves information about a corresponding exhibition object from the database system 37 and transfers the information to the wireless unit 32. The wireless unit 32 transmits the information to the terminal 400. The database system 37 is realized by, for example, a floppy disk unit or a CD-ROM unit. In this way, the stations 33A and 33B carry out a database searching operation instead of the general control unit 10.

The third embodiment classifies exhibition objects 50 into groups according to the kinds and arrangements thereof, and the stations 33A, 33B, . . . are allocated to the groups, respectively. The database system 37 of a given station stores information about exhibition objects of the corresponding group.

The third embodiment is advantageous when the total area of the exhibition facilities is wide, when the facilities are divided into zones, or when the facilities involve many exhibition rooms. For example, the third embodiment is applicable to an art museum having rooms showing different kinds of objects, a trade fair having many zones, a motor show having domestic and import booths, or a zoo having various zones such as African, Asian, and American zones. To control a wide area of the facilities, the general control unit 10 of the first and second embodiments must carry out many operations and requires a large-scale LAN and a large database system, to increase the communication cost and decrease retrieval speed. The stations (33A, 33B, . . . ) of the third embodiment solve these problems.

The third embodiment distributes the stations in the zones of the facilities, respectively, to keep the strength of radio waves used among the general control unit, stations, and terminals within regulations.

In each of the stations 33A, 33B, and the like, the wireless unit 32 instead of the control unit 36 may control the database system 37.

Figure 6:
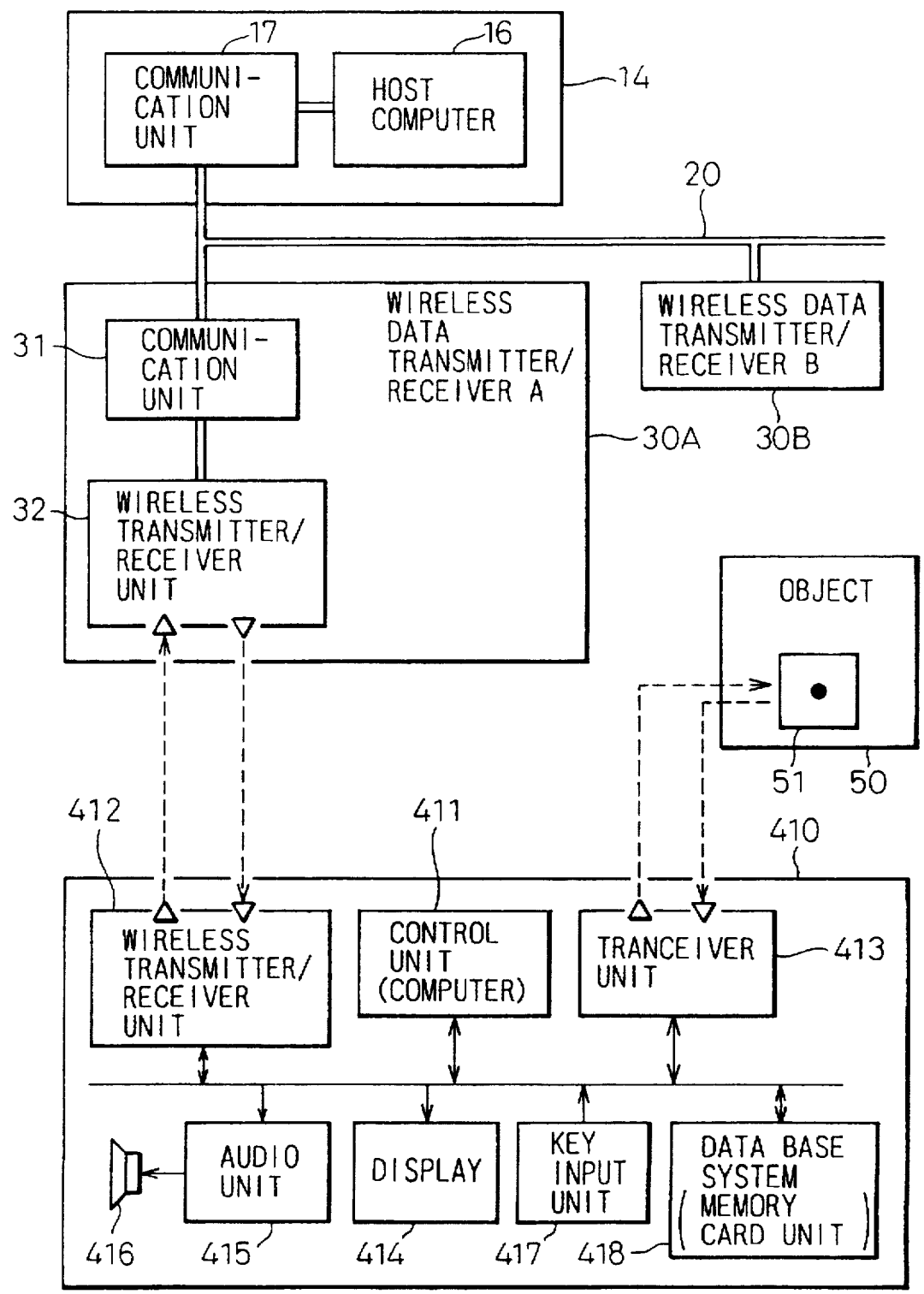
FIG. 6 is a block diagram showing a system according to a fourth embodiment of the present invention.

FIG. 6 is a block diagram showing a system for providing information about exhibition objects according to the fourth embodiment of the present invention.

The fourth embodiment resembles the second embodiment but differs therefrom in that each terminal 410 has a database system 418 and in that a general control unit 14 has no database system. The database system 418 is realized by an IC card or another compact memory that is incorporated in the portable terminal 410. The IC card may store information about all or part of exhibition objects of exhibition facilities. The database system 418 is controlled by a control unit 411. A transceiver 413 receives an identification code from a target exhibition object, and according to the code, the control unit 411 retrieves information about the target from the database system 418. The information is displayed on a display 414 or provided as voice from a speaker 416 through an audio unit 415.

This embodiment is useful for small exhibition facilities containing many genres of exhibition objects. If the number of exhibition objects is not so large, the IC card or another compact memory is sufficient to store information about all of the objects. The IC cards or memories may be prepared for each exhibition room or booth, so that a user may insert the IC card or memory into the terminal 410 to retrieve information therefrom. This embodiment is advantageous when an exhibition period is short, or when exhibition objects are partly replaced with others.

Instead of controlling the database system 418 by the control unit 411, a wireless transmitter/receiver unit 32 of one of wireless data transmitter/receiver stations 30A, 30B, . . . may provide a signal to control the database system 418 of the terminal 410 in response to an identification code received.

Figure 7:
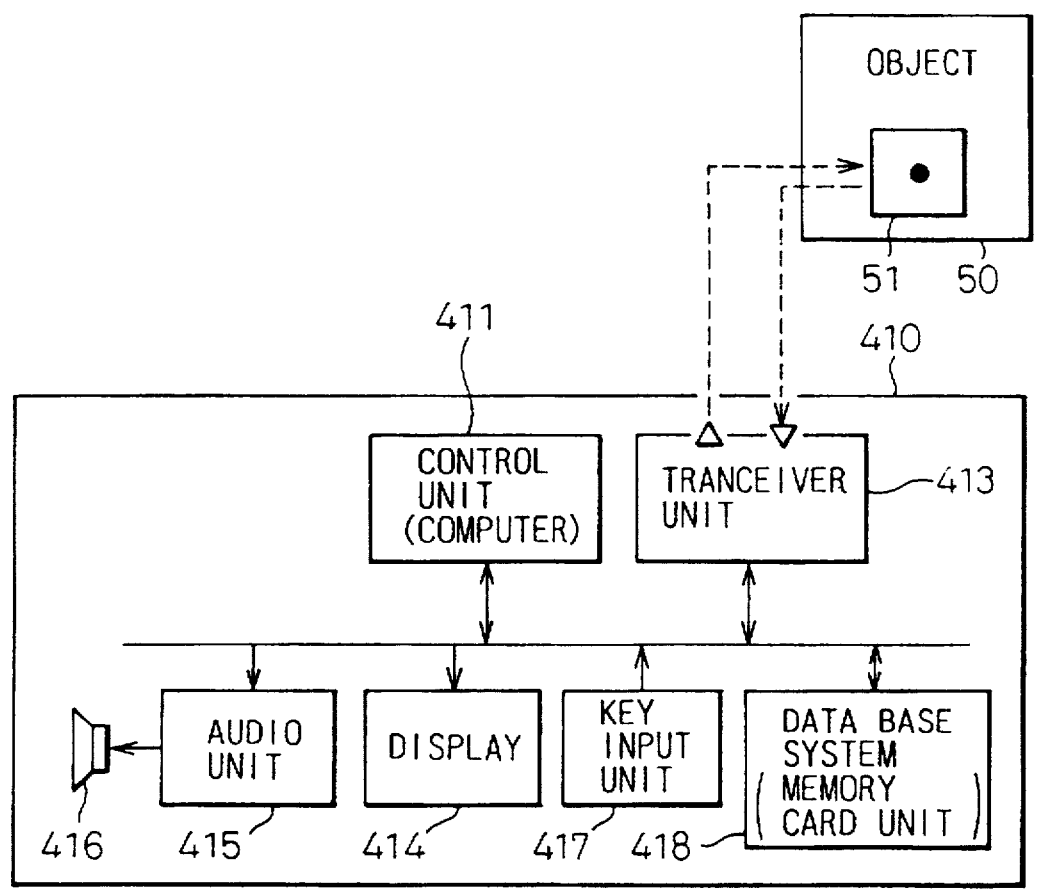
FIG. 7 is a block diagram showing a modification of the fourth embodiment.

According to the fourth embodiment, the terminal 410 carries out everything from detecting an identification code from an exhibition object to retrieving information about the object from the database system 418, so that the general control unit 14 and stations 30A, 30B, . . . may be omitted as shown in FIG. 7.

It is preferable, however, to centrally control the terminals and provide visitors with information that is not stored in the IC card of each terminal 410. In this case, the general control unit 10 having the database system 12 of the first embodiment is useful.

Figure 8:
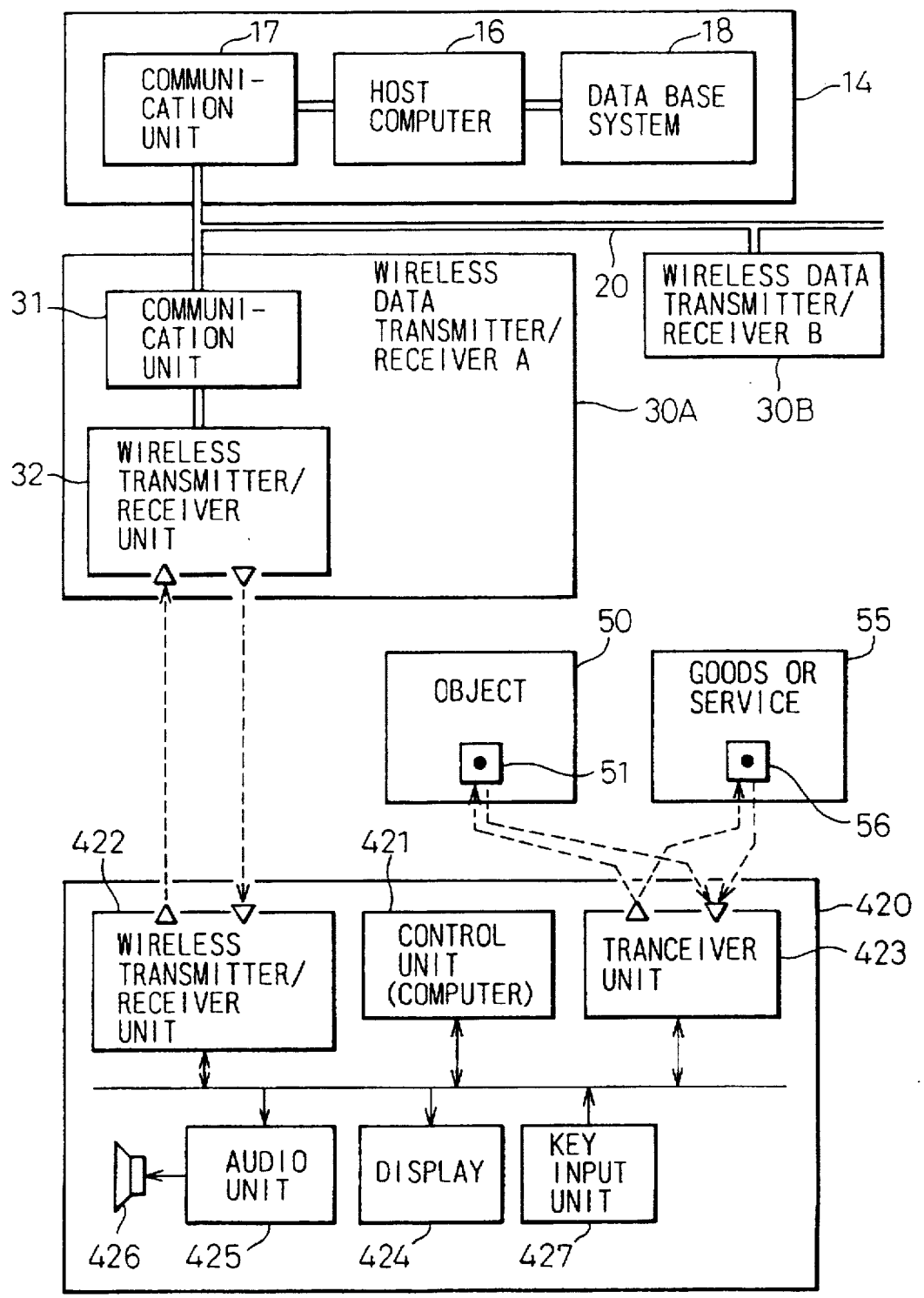
FIG. 8 is a block diagram showing a system according to a fifth embodiment of the present invention.

FIG. 8 is a block diagram showing a system for providing information about exhibition objects, goods, and services according to the fifth embodiment of the present invention.

In addition to exhibiting objects, exhibition facilities usually sell goods and services. The services include food, lodging, amusement, and vehicle services. The fifth embodiment employs the system of the fourth embodiment, to sell visitors goods and services.

According to the fifth embodiment of FIG. 8, exhibition objects 50 and goods and services 55 have each a transponder 56. In response to a request signal from a transceiver 423 of a terminal 420, the transponder 56 returns an identification code and price code of the corresponding goods or service 55. The goods and services 55 having the transponders 56 include vehicles, replicas in show windows, etc.

The terminal 420 is portable as shown in FIG. 2 and is lent to a visitor after registration. The terminal 420 has a key input unit 427 that includes numeric keys and selection keys to specify an amount of money. The user directs the output port of the transceiver 423 of the terminal 420 toward the transponder 56 of a target one of the goods and services 55 and operates the keys. A control unit 421 of the terminal 420 transmits a request signal toward the target 55 through the transceiver 423. In response to the request signal, the transponder 56 of the target returns an identification code and price code, which are received by the transceiver 423. According to the received codes, the control unit 421 displays the name and price of the target 55 on a display 424, or provides voice information about the target through an audio unit 425 and a speaker 426. Similar to the second embodiment, the identification code is transmitted via one of the wireless data transmitter/receiver stations 30A, 30B, . . . , to a general control unit 14, which retrieves information about the target from a database system 18. The information is transmitted via the station to the terminal 420, which displays the information on the display 424 or provides voice information through the audio unit 425. If the user wants to purchase the target 55, he or she operates a button in the key input unit 427, to order the purchase. The control unit 421 transmits the identification and price codes of the target and a code for indicating the purchase through the wireless unit 422 to one of the stations 30A, 30B, and the like. The station transfers the codes to the general control unit 14. According to the codes, the general control unit 14 manages the accounts of the user of the terminal 420. When the terminal 420 is returned, the accounts of the user are settled. The settlement may be done by cash or credit card, together with an entrance fee, service charges, additional tax, and tax deduction.

In this way, the fifth embodiment enables a user to purchase goods and services in the facilities and settle the accounts thereof.

According to the fifth embodiment, the transponder 56 attached to each goods or service returns an identification code and a price code. The transponder 56 may return only the identification code, and the terminal 420 receives the price and information about the corresponding goods or service from the general control unit 14 according to the identification code.

The fifth embodiment is capable of providing not only information about exhibition objects in facilities but also information about goods and services available in the facilities, and settling the accounts of purchased goods and services.

I claim:

1. A system for providing information about exhibition objects in exhibition facilities, comprising:

a database system storing the information about the exhibition objects;

a host computer, having a host transmitter/receiver, the host computer retrieving the information from the database system based on an identification code of a target exhibition object from the exhibition objects, each of the exhibition objects having communication means that returns the identification code in response to a request signal; and at least one terminal having:

a terminal transmitter/receiver transmitting the identification code to the host computer and receiving target information about the target exhibition object from the host computer through the host transmitter/receiver;

an operator switch generating the request signal;

object communication means directed at the target exhibition object for selecting the target exhibition object by transmitting the request signal to the target exhibition object and receiving the identification code from the target exhibition object;

information output means for outputting the target information about the target exhibition exhibition object when the host computer retrieves the target information from the information stored in the database system based on the identification code of the target exhibition object transmitted from the terminal and transmits the target information to the terminal through the host transmitter/receiver means.

2. The system according to claim 1, wherein the host and terminal transmitter/receiver are wireless.

3. The system according to claim 2, wherein the terminal is portable.

4. The system according to claim 3, wherein:

the exhibition objects include goods and services available in the exhibition facilities;

each of the goods and services is provided with the communication means to return the identification code and a price code in response to the request signal;

the object communication means directs the request signal toward a target one of the goods and services; and the information output means of the terminal outputs the identification code and the price code returned from the target.

5. The system according to claim 4, wherein:

the terminal further includes a purchase switch operated after the information output means has outputted the target information about the target to generate a purchase signal to purchase or reserve the target; the terminal transmitter/receiver of the terminal transmits the identifiation code and the purchase signal of the target to the host computer in response to the purchase signal; and the host computer manages user accounts based on the identification code and the purchase signal.

6. The system according to claim 1, further comprising:

stations, each of the stations having a station-host transmitter/receiver communicating with the host computer and a station-terminal transmitter/receiver communicating with the terminal, the terminal communicating with the host computer via one of the stations.

7. The system according to claim 6, wherein the stations are allocated to groups of exhibition objects, respectively, and each of the stations has:

a database system storing information about exhibition objects of the corresponding group; and control means for retrieving the target information from the database system based on the identification code transmitted from the terminal transmitter/receiver, and for transmitting the target information to the terminal through the station-terminal transmitter/receiver.

8. The system according to claim 1, wherein the communication means of each of the exhibition objects include an indicator, and the indicator on the target exhibition object is activated when the object communication means of the terminal selects the target exhibition object.

9. A system for providing information about exhibition objects in exhibition facilities, comprising:

communication means attached to each of the exhibition objects, for returning an identification code of a target exhibition object from the exhibition objects in response to a request signal directed to the target exhibition object; and at least one terminal having:
  a database system storing the information about the exhibition objects;
  an operation switch generating the request signal;
  terminal-object communication means directed at the target exhibition object for selecting the target exhibition object by transmitting the request signal to the communication means of the target exhibition object and receiving the identification code from the target exhibition object;
  control means for retrieving target information about the target exhibition object from the database system based on the identification code; and
  information output means outputting the target information.

10. The system according to claim 9, wherein the communication means of each of the exhibition objects include an indicator, and the indicator on the target exhibition object is activated when the terminal-object communication means selects the target exhibition object.

* * * * *